US006424936B1

(12) United States Patent
Shen et al.

(10) Patent No.: US 6,424,936 B1
(45) Date of Patent: Jul. 23, 2002

(54) BLOCK SIZE DETERMINATION AND ADAPTATION METHOD FOR AUDIO TRANSFORM CODING

(75) Inventors: Sheng Mei Shen; Sua Hong Neo; Ah Peng Tan, all of Singapore (SG)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/427,592

(22) Filed: Oct. 27, 1999

(30) Foreign Application Priority Data

Oct. 29, 1998 (JP) .......................... 10-308312

(51) Int. Cl.[7] .............................................. G10L 21/04
(52) U.S. Cl. ................... 704/200.1; 704/230; 704/504; 704/229
(58) Field of Search ............................ 704/200.1, 200, 704/201, 205, 207, 500, 502, 504, 230, 229, 212, 219, 503, 203

(56) References Cited

U.S. PATENT DOCUMENTS

| 5,297,236 A | | 3/1994 | Antill et al. | |
|---|---|---|---|---|
| 5,394,473 A | * | 2/1995 | Davidson | 704/200.1 |
| 5,471,558 A | | 11/1995 | Tsutsui | |
| 5,502,789 A | | 3/1996 | Akagiri | |
| 5,583,962 A | * | 12/1996 | Davis et al. | 704/229 |
| 5,632,005 A | * | 5/1997 | Davis et al. | 704/504 |
| 5,651,089 A | * | 7/1997 | Teh | 704/203 |

FOREIGN PATENT DOCUMENTS

| EP | 0446031 | 9/1991 |
|---|---|---|
| EP | 0545017 | 6/1993 |
| EP | 0612158 | 8/1994 |
| WO | 91/16769 | 10/1991 |

OTHER PUBLICATIONS

Article entitled "A 128 Kb/s Hi–Fi Audio CODEC Based On Adaptive Transform Coding With Adaptive Block Size MDCT", which was published in IEEE Journal on Selected Areas In Communications., vol.10, No. 1, Jan., 1992.

Article entitled "Information Technology–Coding Of Moving Pictures And Associated Audio for Digital Storage Media At Up To About 1.5 Mbits/s", Part 3: Audio (ISO/IEC 11172–3: 1993).

Article entitled "Subband/Transform Coding Using Filter Band Designs Based On Time Domain Aliasing Cancellation", published by Prince, Johnson, and Bradley, Proceedings of the ICASSP, 1987 at pp. 2161–2164.

Article: Presented at the 90th Convention of Audio Engineering Society (AES), Feb. 1991, entitled " Aspec: Adaptive Spectral Entropy Coding of High Quality Music Signals", by K. Brandenburg et al..

* cited by examiner

Primary Examiner—Richemond Dorvil
(74) Attorney, Agent, or Firm—Greenblum & Bernstein, P.L.C.

(57) ABSTRACT

A method for identifying and categorizing an audio signal into subclasses to determine a subframe block size of a transform coder. A number of block sizes available for the transform coder is determined. An input audio signal is then sampled at predetermined time intervals to produce a plurality of samples, which are grouped into frames, in which each frame has an equal number of samples. The frames are analyzed in a time domain to produce at least one comparison index, after which an appropriate block size is selected for the transform coder.

11 Claims, 7 Drawing Sheets

BLOCK SIZE DETERMINATION AND ADAPTATION METHOD FOR AUDIO TRANSFORM CODING

BACKGROUND OF THE INVENTION

1. Field of the Invention

The present invention relates to the efficient information coding of digital audio signals for transmission or digital storage media.

2. Description of the Related Art

Audio compression algorithms using various frequency transforms such as subband coding, adaptive transform coding or their hybrids have been developed and used in a variety of commercial applications. Examples of adaptive transform coders include those reported by K. Brandenburg et al in "Aspec: Adaptive spectral entropy coding of high quality music signals", $90^{th}$ AES Convention, February 1991 and by M. Iwadare et al in "A 128 kb/s Hi-Fi Audio Codec based on Adaptive Transform Coding with Adaptive Block Size MDCT", IEEE Journal on Selected Areas in Communications, Vol. 10, No. 1, January 1992. Examples of algorithms using hybrid subband and adaptive transform coding include the ISO/IEC 11172-3 Layer 3 algorithm and the ATRAC compression algorithm used in the Mini-Disc system. Details of these algorithms can be found in the "Information Technology—Coding of Moving Pictures and Associated Audio for Digital Storage Media at up to About 1.5 Mbit/s Part 3: Audio (ISO/IEC 11172–3:1993)" document and chapter 10 of the MD system description document by Sony in Sep. 1992 respectively. The transform filter bank used by these algorithms is typically based on Modified Discrete Cosine Transform, first proposed by Princen and Bradley in "Subband/Transform Coding Using Filter Bank Designs Based on Time Domain Aliasing Cancellation", Proceedings of the ICASSP 1987, pp 2161–2164.

In a typical transform encoder, as shown in FIG. 5, the input audio samples are first buffered by buffer 51 in frames, and at the same time passed to a block-size selector 52 to determine the suitable block size or window prior to the windowing and transform by window and transform unit 53, of the audio samples. In a hybrid subband and transform coder such as the ATRAC algorithm, the input audio samples, sampled at 44.1 kHz, i.e., 44100 samples generated per second, are subjected to a hybrid subband and transform coding. The hybrid subband-transform front-end of the encoding process of the ATRAC algorithm is shown in FIG. 6. The input audio samples are first subband filtered into two equal bandwidths using quadrature mirror filter 61 and the resultant lower frequency band is further subdivided into two equal bandwidths by another set of quadrature mirror filter 62. Here, L, M, H means Low band, Middle band, and High band, respectively. A time delay 63 is used to time-align the signal in high-frequency band with those of the lower frequency bands. The subband samples are then separately passed to the block size selector 64 to determine suitable block sizes for the windowing and the modified discrete cosine transform processes in blocks 65, 66 and 67. One of the two block sizes or modes will be selected for each of the frequency bands. The transformed samples are then grouped into units and within each unit, a scale factor equivalent to or just exceeding the maximum amplitude of the unit samples is selected. The transformed samples are then quantized using the determined scale factors and the bit allocation information derived from the dynamic bit allocation unit 68.

It is known that, in transform coding, a pre-echo or a noise/ringing effect in the silent period before a sudden increase of signal magnitude, or an attack, can occur, particularly if transform coding block size for the audio frame containing the attack is long. Modified discrete cosine transform with adaptive block sizes is typically used to reduce the pre-echo as well as the noise at block boundaries. The block sizes available for the transform coding must in the first place be selected such that if a signal attack were to be detected, a short block transform could be used to process the attack signal and will not give rise to ringing or noise signal to the adjacent blocks. When the size of the short block is made small enough, the pre-echo will not be audible. An important issue is the accurate detection of an attack signal itself.

The block size decision method outlined in the MD system description of Sep 1992 is shown in FIG. 7. The peak detection step 71 identifies the peak value within each 32 sample block. The adjacent peak values are then compared in step 72. In the decision step 73, where the difference exceed 18 dB, mode 1 or the short block mode step 74 is selected. Otherwise, mode 3 or mode 4 which is the long block mode step 75, for the different frequency bands, will be selected.

A highly effective audio signal classification and block size determination method is needed for very good reduction of pre-echo during adaptive transform or hybrid subband-transform coding. This is to render the pre-echo to be totally inaudible. While it is recognised that the actual block sizes being used for the transform is in itself an important factor, the accurate detection of signal attack and particularly the critical ones is very significant. Generally, it is desired to use long block for transform coding of the audio signals as the corresponding better frequency resolution obtained will give rise to more accurate redundancy and irrelevancy removal of the audio signal components. This is especially true for segments of the audio signals where the characteristics of the audio signal varies slowly. Short blocks are to be used only when identified to be absolutely necessary and for the critical attack signals. The block size decision method provided in the prior art does not give good result in transient or attack signal detection accuracy. It can fail to detect an attack signal which occur within a time interval of premasking duration. Premasking is the condition whereby presence of a fast buildup of loud sounds or attack occurring in time has a masking effect on the sound preceding the attack. Failure of such detection can sometimes give rise to undesirable audible effects. While single-tone masker experiments have demonstrated premasking duration lasting between 5 ms and 20 ms, empirically, pre-echo of shorter duration has been audible. The effective premasking duration is expected to be in the region of less than 5 ms. Post masking effect, the lingering masking effect after occurrence of a masker, typically spans 20 ms or more. Where long block frame size is typically less than 20 ms, the release of a peak signal is normally regarded as having insignificant effect. For very high accuracy block size determination, post masking effect could be taken into account.

SUMMARY OF THE INVENTION

This invention is based on the need for a high accuracy block size decision scheme and has taken into account temporal masking considerations, both the premasking and postmasking effects. In this invention, means of operating on full bandwidth audio signals or on limited bandwidth signals, for example, after subband filtering into frequency bands are possible. This invention has the means of grouping audio samples in a current considered frame into subframes of equal time interval of approximately 3 ms, in consideration of empirical premasking duration, excepting the final subframe which is of half the time interval; this said current considered frame together with the whole or half of the final subframe of the previous considered frame, and optionally, half subframe from the future frame constituting the extended frame, will be used for peak value estimate; means to identify the said peak values within the said subframes; means to compute the differences between said peak values of adjacent time intervals; means to, optionally, compute the differences between said peak values separated by a subframe time interval; means to decide whether long block size or short block size should be used after comparing the said differences with predetermined threshold. An alternative method comprises the means of grouping samples in current frame together with the whole or half of the final subframe of the previous considered frame, the said subframe interval being determined by the temporal hearing characteristics of the human ear; means of identification of a selected number of peak values within the resultant grouping; means of the designating a peak value, selected in order of magnitude, as reference peak value; means of identification of the peak value from within a subframe interval preceding the reference peak value; means of computation of the difference between the reference peak value and the peak value within the said subframe interval preceding it; means of comparison of the said difference with predetermined threshold values, wherein a smaller block size is invoked when the difference exceed the predetermined threshold value; otherwise a new reference peak is used and the process repeated until a difference exceeding the predetermined threshold is found or when all the available peak values have been considered.

The means of grouping audio samples in a current considered frame into subframes, first involve taking a designated number of audio samples from the previous frame and optionally the future frame, together with all samples in the current frame. The time interval for each subframe should span approximately 3 ms, based on an empirically determined premasking duration. The designated number of audio samples should be approximately of half subframe duration. The grouping into subframes can proceed as illustrated in FIG. 3. In allowing for computing the difference between the peak of a current subframe and up to two previous subframes will allow for a wider scope of signals to be classified as attack signals. The obtained difference in peak values is then compared against a positively set threshold value. This means that the post masking effects of release of signal will be ignored. Should it be desired to consider the effects of the less significant postmasking, comparison against a negative threshold will be necessary. The first set of means whereby the audio samples are first grouped into subframes provide for a convenient and computationally less intensive method of obtaining peak values and computation of differences for the purpose of block size determination. However, the set of means does not thoroughly search for all possible signal attacks or transients. The alternative set of means whereby a selected number of peak values are first identified within the said extended frame will allow a more thorough search. Subject to computational load permitted, a maximum number of peaks is first identified. The highest peak value is first taken as the reference peak. From a time window of a subframe from this reference peak, a peak value is established and the difference with the reference peak is computed. If the difference is not larger than predetermined threshold; the procedure is repeated using the second highest peak value as reference peak value and so forth. The process is repeated until a difference exceeding the predetermined threshold is found or when all the available peak values have been considered.

DESCRIPTION OF THE PREFERRED EMBODIMENTS

Figure 1:
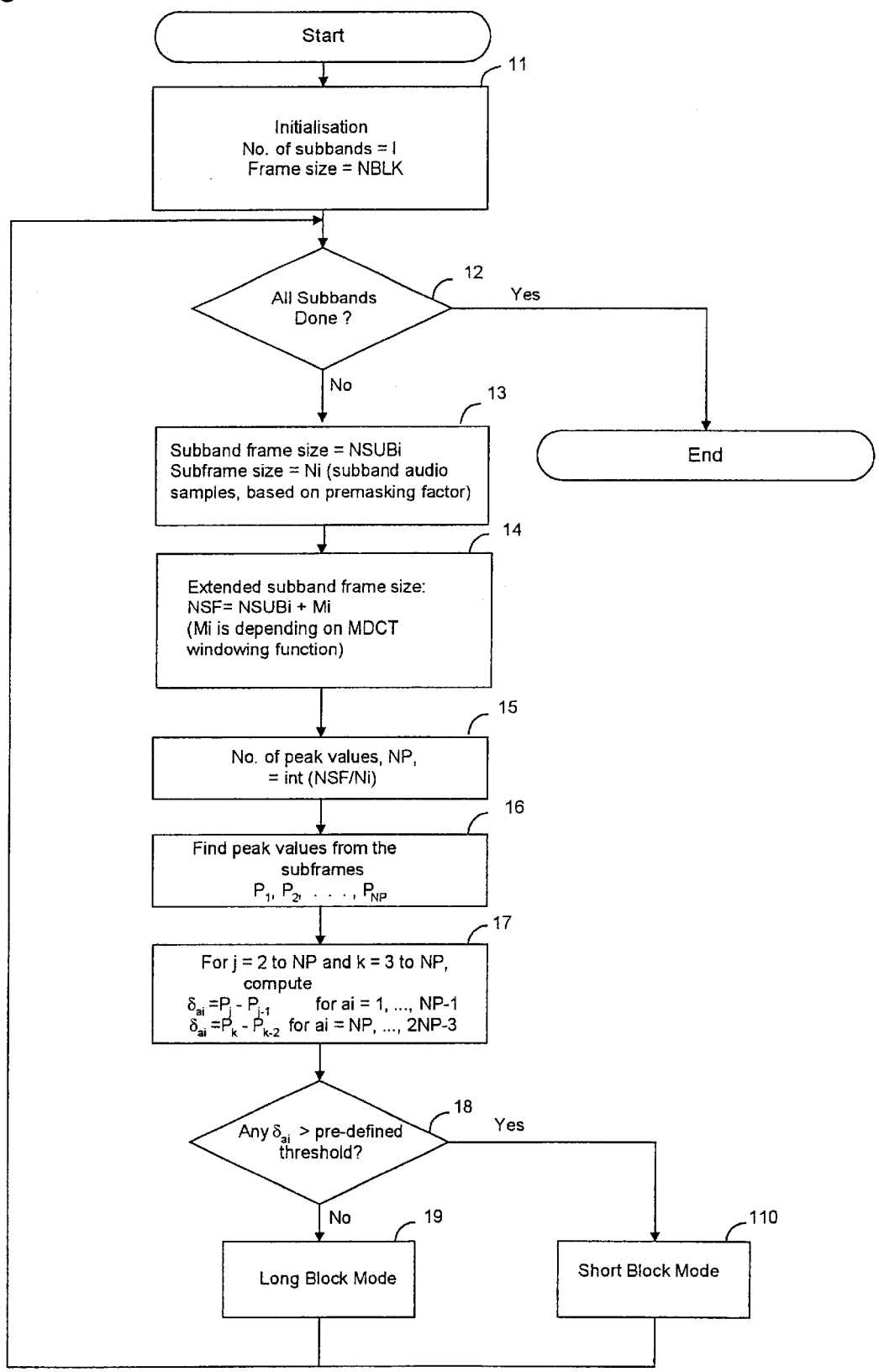
FIG. 1 is the flow chart of an embodiment of the invention of an improved subframe division block size determination method.
Figure 3:
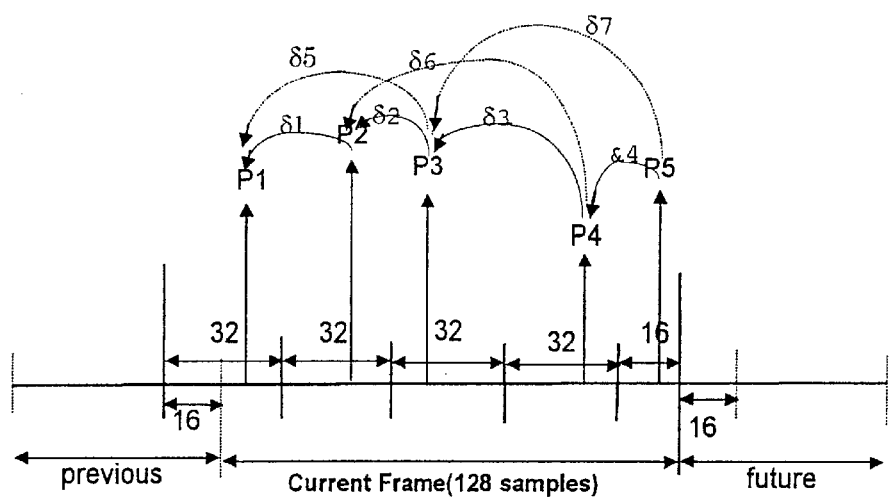
FIG. 3 is an illustration of a subframe method and the difference computation.

A flow chart of an embodiment, termed as Improved Subframe Division Block Size Determination Method, is shown in FIG. 1. In the general context, a hybrid subband transform coder is inherently assumed. In the case where only transform coding is purely used, the number of subband may be treated as 1. Each subband frame as defined in step 14 of FIG. 1 is partitioned into subframes. For the purpose of illustration, an example using a subband frame size of 128 samples is shown in FIG. 3. A subband subframe size of 32samples which translates to a time interval of approximately 3.0 ms is adequate based on premasking considerations.

In this embodiment, there are two major differences from the prior art. One is the 16-sample extension of the current subband frame size of 128 for detecting an attack signal, instead of only using 128 -samples. This extension comes from the windowing function of MDCT. The other is to check the difference between peak values separated by a subframe segment, besides to check the difference between the adjacent peak values, if the difference between adjacent peak values is less than the predetermined threshold. Both are required to reduce probability of miss in the detection of attack signal.

After the initialization of the number of subbands and frame size in step 11, block size determination is performed for each and every subband. A decision step 12 ascertains whether all the subbands have been analyzed. Depending on the types of subband filtering performed, whether equal or unequal subband bandwidths are used for all subbands, the value assignment of subband frame size and the appropriate subframe size in step 13 will vary accordingly. In step 14, each subband frame is extended to NSF (=NSUBi+Mi) by taking into account for all covered samples by window function of MDCT. Here, Mi is the number of the extended samples. For example, for MDCT of 32-sample, the number of extended samples is 16.

The number of segments for the purpose of peak identification is computed in step 15. The peak values within each segment are identified in step 16. The differences between adjacent peak values and between peak values separated by a subframe segment are computed in step 17. As long as a single difference exceed the predetermined threshold, as determined in the decision step 18, a short block assignment step 110 will be performed. Otherwise, a long block assignment step 19 will be provided.

The extended subband frame, as illustrated in FIG. 3, is formed for the purpose of peak value identifications. Based on the example of FIG. 3, where 32 is the subframe size, the number of the extended samples will be 16 based on the window function used for MDCT of 32-sample. The subband frame size of 128 samples together with the 16 samples from the previous frame will be considered for attack signal detection. Therefore, four 32-samples sub-frames and one 16-sample sub-frame will be used in each determination iteration. Here the 16 samples which come from the future frame, as shown in FIG. 3, can be neglected since the windowing values drop sharply in this period and also this part is the final part of the extended subband frame. So, the number of peak values to be computed is 5. Altogether, a maximum of 7 difference computations among the peak values will be performed. For implementation efficiency, as soon as one computed difference exceed the predefined threshold, the short block mode will be activated. Typically, the additional comparisons between P3 and P1, P4 and P2, P5 and P3 are needed when all of $\delta_i$ (i=1 ,2, 3, or 4) are less than the predetermined threshold. As long as one of $\delta_i$ (i=1, 2, 3, 4, 5, 6, or 7) is larger than the predetermined threshold, then the comparison may be stopped to save computation time.

Figure 2:
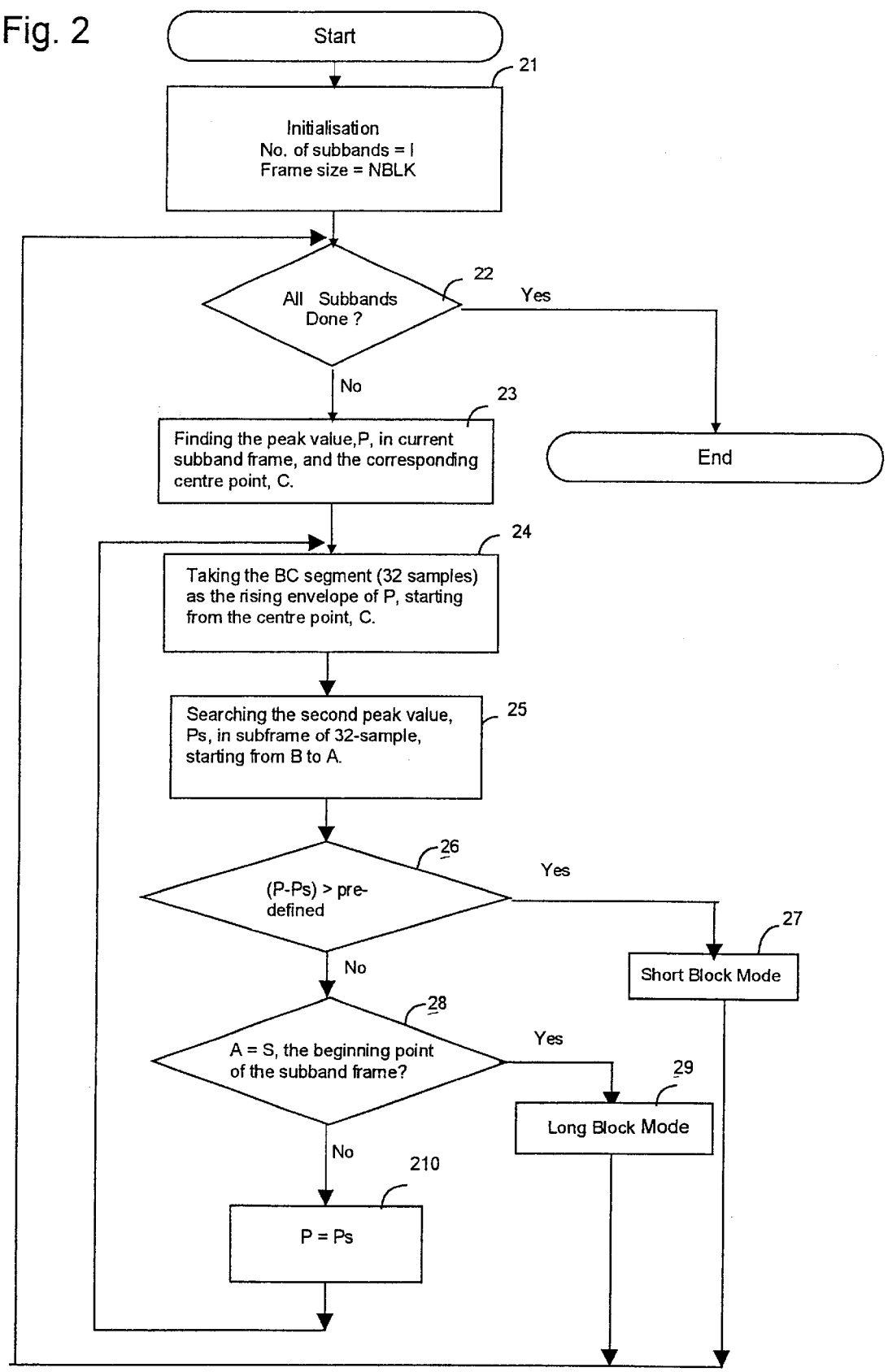
FIG. 2 is the flow chart of a second embodiment of the invention of peak energy centered block size determination method.
Figure 4:
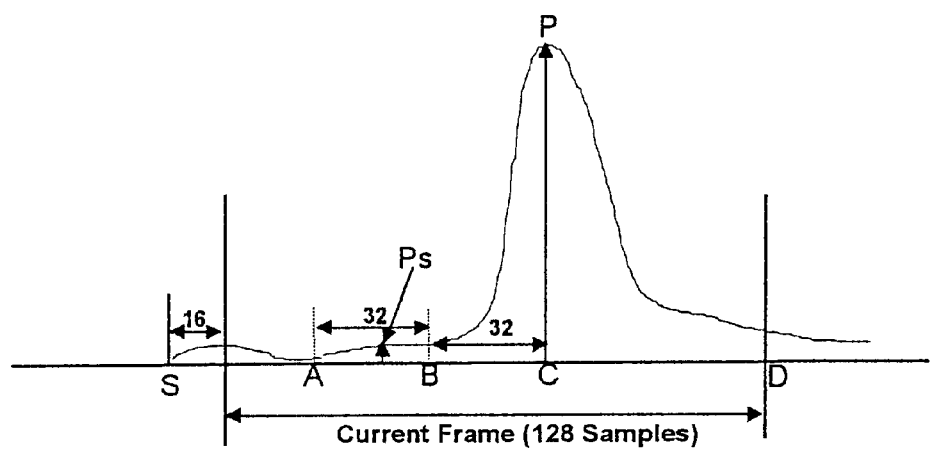
FIG. 4 is an illustration of a peak energy centered block size determination method.
Figure 5:
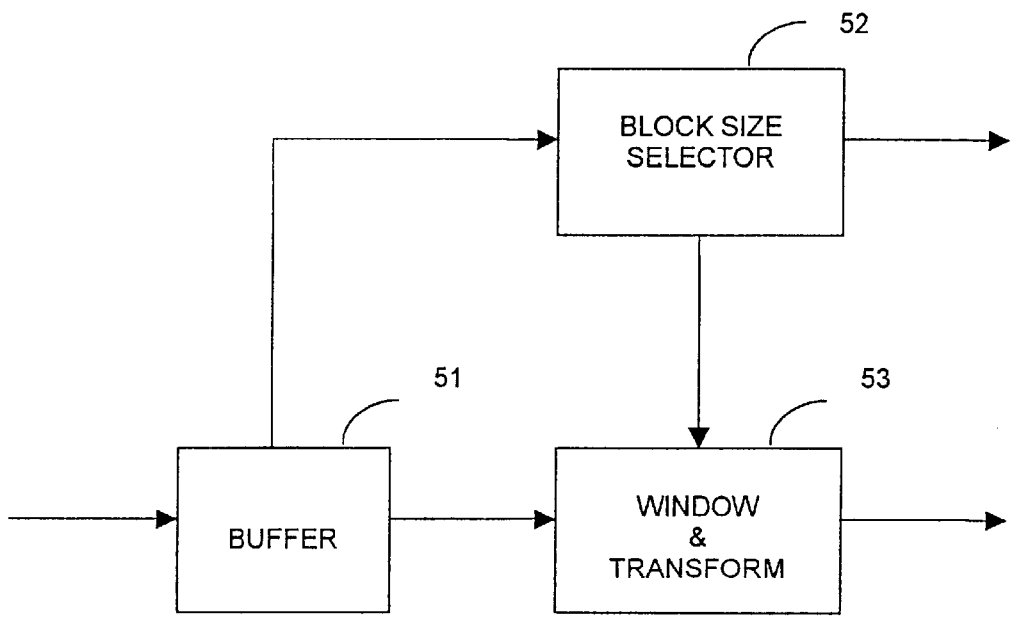
FIG. 5 is a block diagram of the front-end of an adaptive transform encoder.
Figure 6:
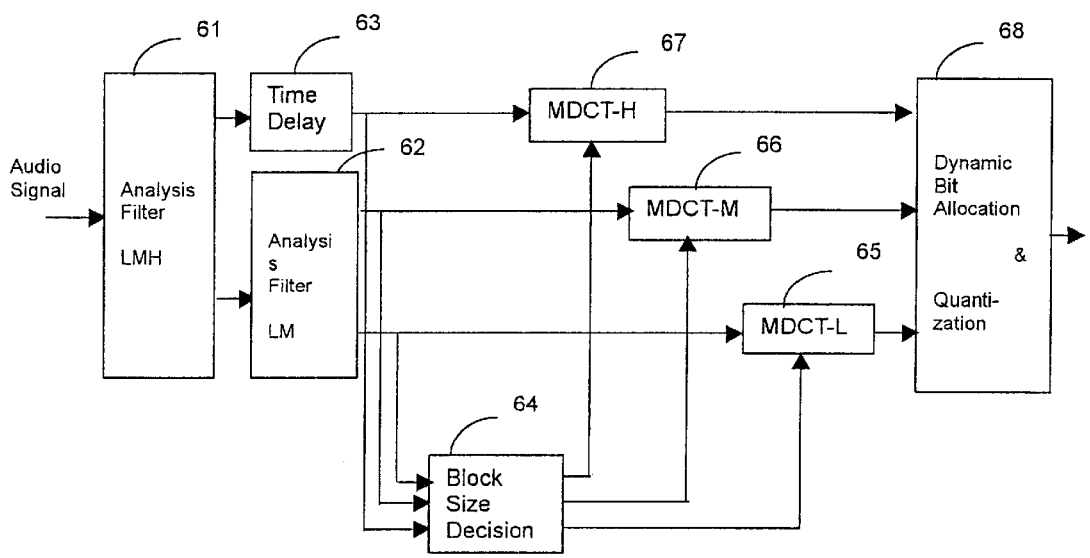
FIG. 6 is a block diagram of the front-end of the ATRAC encoder.
Figure 7:
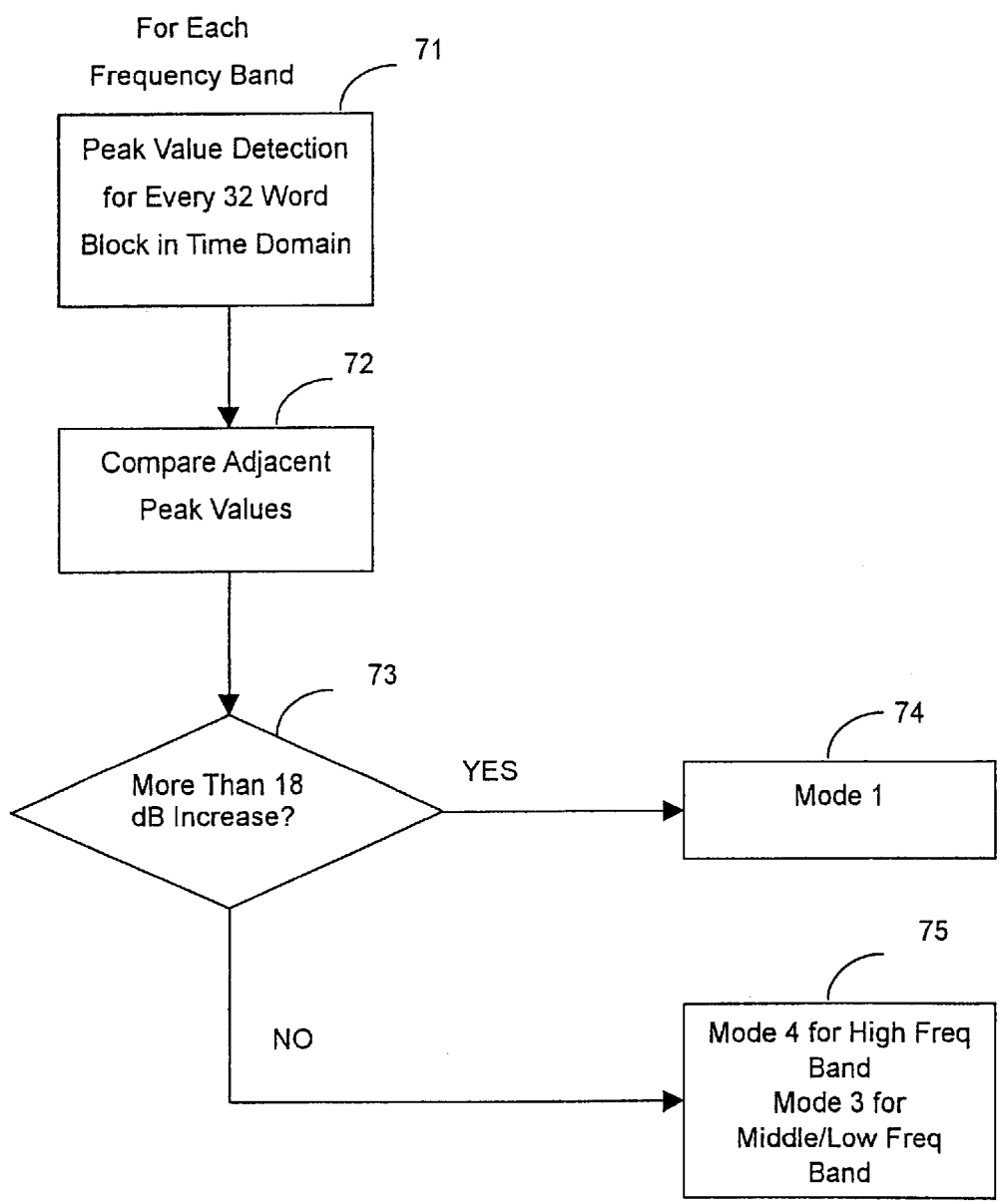
FIG. 7 is a flow chart of the prior art of the block size determination method.

An alternative embodiment, termed as Peak Energy Centered Block Size Determination Method, is shown in FIG. 2. An attack signal may be considered as the energy of the signal rising sharply over certain duration of a signal. Approximately, the instance of the peak value in a signal may be regarded as the center of the sharply rising energy if there is an attack signal in the same duration, as shown in FIG. 4. This is true for many instances, by empirical observation.

As shown in FIG. 4, P is the peak value of the signal in the period of SD. C is the position of the peak value of P, and it is the focal point of the energy of the signal in the period of SD. The point B is just 32 samples from point C. Another peak value is searched starting from point B to point A, treating it as a 32-sample sub-block. If the peak value P is larger than the second peak value, Ps, compared to the predetermined threshold, then it is determined that there is an attack signal appearing in this current block. Short block MDCT will then be applied to this current block. Otherwise, the second peak value Ps is taken as the new P, and the above steps are then iteratively applied until the point S is reached. If there is no other peak value, larger than its second peak value Ps then long block MDCT is applied.

FIG. 2 is the flow chart for peak energy centered block size determination method. The meaning of P, Ps, C, B, A, and S is as shown in FIG. 4. In FIG. 2, step 21 is the initialization of the block size determination for an audio signal. Step 22, is to check whether all the subbands have been examined for block size determination. If "Yes", the process will then be terminated. Otherwise block size determination will be performed for the following subbands.

In step 23, the peak value P is found for the current subband frame, and the Peak Energy Centred point C is correspondingly located. In step 24, the rising envelope period of peak energy value P is assumed to be the BC segment which is 32-sample subblock, started from the center point of C. In step 25, the second peak value Ps is searched in a 32-sample of subblock, bounded by points B and A. If the second peak value Ps is less than P by a predetermined threshold in step 26, then a short block mode will be assigned in step 27. Otherwise, in step 28, a check of whether point A coincides with the beginning point of the subband S is done. If not, then Ps is taken as the new P, in step 210 and the above steps 24, 25, 26, 27, and 28 are repeated. If "YES", then a long block mode will be assigned for the current subband frame.

FIG. 4 is valid when the length of SC is longer than two times of 32-sample. For cases when the length of SC is shorter than two times of 32-sample, the length of BC is not fixed at 32, but will be SC/2, which is less than 32-sample. For this case, the length of SB is also less than 32, and will be SC/2. That is to say, B will be the middle point between S and C.

In the case when the length of SC is shorter than 16-sample, half of the 32-sample, which is corresponding to 1.45 ms, a long block MDCT will be used to the current block. Even in this case when an attack signal in the beginning part of the current block exists, pre-masking can mask out the short period of pre-echo of less than 29 ms, which is caused by this attack signal.

The present invention is highly effective in the detection of audio signal attacks, and optionally, the release of the signal. The use of any of the described block size decision techniques will result in highly accurate detection of the critical transient signal attacks, consequentially leading to reduction or elimination of audible pre-echo. This is possible provided appropriate block sizes for the transform coding are used. Different technique options are incorporated, depending on the amount of computational load, RAM and ROM supportable.

What is claimed is:

1. A method for identifying and categorizing an audio signal into subclasses to determine a subframe block size of a transform coder, comprising:

detecting a number of block sizes available for the transform coder;

sampling an input audio signal at predetermined time intervals into samples, and grouping said samples into frames each having an equal number of samples;

analyzing the frames in time domain to produce at least one comparison index by:

extending each frame in accordance with a window function used in the transform coder;

subdividing the extended frame containing the audio samples into smaller subframes, the number of smaller subframes being determined by a time interval determined by temporal hearing characteristics of a human ear;

identifying a peak value within each subframe based on an amplitude of the samples within the subframe;

computing a difference between the peak value of adjacent subframes and the peak value of two subframes which are separated by a subframe time interval, the difference being used as the comparison index; and comparing the index with a predetermined threshold value, such that a smaller block size is invoked when the index is greater than the predetermined threshold value, and a larger block size is invoked when the index is not greater than the predetermined threshold value; and selecting an appropriate block size for the transform coder.

2. A method according to claim 1, wherein said audio signal is a full bandwidth audio signal.

3. A method according to claim 1, wherein said audio signal is a limited bandwidth audio signal.

4. The method of claim 1, wherein said audio samples within a final subframe interval of a preceding audio frame are taken into account when computing the difference between peak values.

5. A method for identifying and categorizing an audio signal into subclasses to determine a subframe block size of a transform coder, comprising:

detecting a number of block sizes available for the transform coder;

sampling an input audio signal at predetermined time intervals into samples, and grouping said samples into frames each having an equal number of samples;

analyzing the frames in time domain to produce at least one comparison index by:

extending each frame by considering a window function used in said transform coder;

identifying a designated number of peak values within each extended frame based on an amplitude of the samples within the extended frame, each peak value being a local maximum amplitude value;

identifying a subband interval as determined by temporal hearing characteristics of a human ear, taking a highest peak value as a reference peak value, identifying the peak value from within a subframe interval preceding the reference peak value;

computing a difference between the reference peak value and the peak value within a subframe interval preceding it; and comparing the difference with predetermined threshold values, wherein a smaller block size is invoked when the difference exceeds the predetermined threshold value; and selecting an appropriate block size for the transform coder.

6. The method of claim 5, wherein comparing the difference with predetermined threshold values comprises:

repeatedly identifying a subband interval, and computing a difference, and comparing the difference when the difference does not exceed the predetermined threshold value, by taking the highest peak value as a new reference peak value; and determining a large block size when no difference exceeding the predetermined threshold value can be found after all local maximum values have been exhausted in the last subframe interval.

7. The method of claim 6, wherein a last subframe interval is one of equal to and less than its previous subframe interval.

8. The method of claim 5, wherein identification of the peak value from between two subframe interval and one subfame interval preceding the reference peak value take place when comparing the difference with predetermined threshold values does not yield a difference exceeding predetermined thresholds.

9. The method of claim 5, wherein said samples within a final subframe interval of a preceding audio frame are taken into account when computing the difference between peak values.

10. A method for identifying and categorizing an audio signal into subclasses to determine a block size of a transform coder, comprising:

partitioning the audio signal into different frequency bands;

grouping audio samples in each and every frequency band into frames of an equal time interval, a number of the audio samples in frames belonging to different frequency bands may not necessarily be equal; and subjecting each said frame of equal interval to an analyzing method giving rise to different block size decisions for different frequency bands, wherein said analyzing method comprises:

extending each frame in accordance with a window function used in the transform coder;

subdividing the extended frame containing the audio samples into smaller subframes, the number of smaller subframes being determined by a time interval determined by a temporal hearing characteristics of the human ear;

identifying a peak value within each subframe based on an amplitude of the samples within the subframe;

computing a difference between a peak value of adjacent subframes and a peak value of two subframes which are separated by a subframe time interval, the difference being used as a comparison index; and comparing the comparison index with a predetermined threshold value, such that a smaller block size is invoked when the comparison index is greater than the predetermined threshold value, and a larger block size is invoked when the comparison index is not greater than the predetermined threshold value.

11. A method for identifying and categorizing an audio signal into subclasses to determine a block size of a transform coder, comprising:

partitioning the audio signal into different frequency bands;

grouping audio samples in each and every frequency band into frames of an equal time interval, a number of the audio samples in frames belonging to different frequency bands may not necessarily be equal; and subjecting each frame of equal interval to an analyzing method giving rise to different block size decisions for different frequency bands, wherein the analyzing method comprises:

extending each frame by considering a window function used in the transform coder;

identifying a designated number of peak values within each extended an amplitude of the samples within the extended frame, each peak value being a local maximum amplitude value;

identifying a subframe interval as determined by a temporal hearing characteristics of the human ear, taking a highest peak value as a reference peak value, identifying the reference peak value from within a subframe interval preceding the reference peak value;

computing a difference between the reference peak value and a peak value within a subframe interval preceding it; and comparing the difference with predetermined threshold vales, wherein a smaller block size is invoked when the difference exceeds a predetermined threshold value.

* * * * *

UNITED STATES PATENT AND TRADEMARK OFFICE
CERTIFICATE OF CORRECTION

PATENT NO.      : 6,424,936 B1
DATED           : July 23, 2002
INVENTOR(S)     : S. M. Shen et al.

It is certified that error appears in the above-identified patent and that said Letters Patent is hereby corrected as shown below:

Column 8,
Line 62, "vales" should be -- values --.

Signed and Sealed this

Fifteenth Day of April, 2003

JAMES E. ROGAN
*Director of the United States Patent and Trademark Office*